United States Patent [19]

Trutschel et al.

[11] 4,260,144
[45] Apr. 7, 1981

[54] DRIVE FOR A CONVEYOR DRUM IN A FOLDER

[75] Inventors: Hartwig H. Trutschel; Günter K. Schmitt, both of Würzburg; Franz J. Sendelbach, Roden, all of Fed. Rep. of Germany

[73] Assignee: Koenig & Bauer Aktiengesellschaft, Würzburg, Fed. Rep. of Germany

[21] Appl. No.: 111,636

[22] Filed: Jan. 14, 1980

[30] Foreign Application Priority Data

Feb. 20, 1979 [DE] Fed. Rep. of Germany ....... 2906423

[51] Int. Cl.³ .................... F16H 21/14; B65H 45/16
[52] U.S. Cl. ........................... 270/14; 101/232; 270/47; 270/60
[58] Field of Search .............. 101/232, 409, 246; 270/8, 9, 13, 14, 45, 47, 49, 48, 50, 58, 59, 60, 63–65, 70, 76, 77, 4, 6, 7; 74/793, 65, 66, 67, 68; 271/80, 82, 114, 270

[56] References Cited

U.S. PATENT DOCUMENTS

| | | | |
|---|---|---|---|
| 1,450,574 | 4/1923 | Barber | 270/60 |
| 2,084,783 | 6/1937 | Seybold | 271/270 |
| 2,571,806 | 10/1951 | Wood | 271/270 |

FOREIGN PATENT DOCUMENTS

| | | | |
|---|---|---|---|
| 547993 | 4/1932 | Fed. Rep. of Germany | 270/16 |
| 592705 | 2/1978 | U.S.S.R. | 271/270 |

*Primary Examiner*—J. Reed Fisher
*Attorney, Agent, or Firm*—Jones, Tullar & Cooper

[57] ABSTRACT

A planetary crank drive gear arrangement for a conveyor drum in a folder of a web-fed rotary printing machine is disclosed. The planetary crank drive gear arrangement includes a pair of spaced planetary gears which cooperate with a sun gear through which the shaft of the conveyor drum passes. A swing disk is carried on the conveyor drum shaft and is so weighted to compensate for the additional weights added by the planetary crank drive gears and the like. The planetary crank drive gear arrangement allows the conveyor drum to be either accelerated or decelerated without adversely affecting the drive for the printing machine.

5 Claims, 4 Drawing Figures

DRIVE FOR A CONVEYOR DRUM IN A FOLDER

FIELD OF THE INVENTION

The present invention is directed generally to a drive means for a conveyor drum in a web-fed rotary printing machine. More specifically, the present invention is directed to a planetary crank drive gear arrangement for the conveyor drum. Most specifically, the present invention is directed to a planetary crank drive gear arrangement which allows acceleration or deceleration of the conveyor drum without adversely affecting the printing machine drive. The drive gear assembly includes a pair of planetary gears at either end of a wheel lever. These planetary gears run on a sun gear which is journaled on the conveyor drum shaft. One of the planetary gears drives a swing disk and the other drives a crank lever which causes rotation of the conveyor drum. The weights of the various components are selected to avoid any imbalances as the speed of the conveyor drum is varied.

DESCRIPTION OF THE PRIOR ART

Conveyor drums which rotate at non-uniform speeds and which are used in folders, are generally known in the art. It is also known generally in the art, as may be seen in German Pat. No. 547,993, to use a crank gear for the drive of a conveyor drum. In practice however, conveyor drums which rotate at a non-uniform speed have rarely been used for conveying signatures of sheets. The non-uniform rotational speed of the conveyor drum has adversely affected the whole drive system of the printing machine in which the conveying drum is used. The varying of the speed of the conveyor drum has created stresses which cause excessive wear in the drive system for the printing machine.

SUMMARY OF THE INVENTION

It is an object of the present invention to provide a drive assembly for a conveyor drum.

A further object of the present invention is to provide a planetary crank gear drive assembly for a conveyor drum.

Yet another object of the present invention is to provide a drive assembly for allowing non-uniform rotational speed of the conveyor drum in the folder of a web-fed rotary printing press.

As will be discussed in greater detail in the description of a preferred embodiment as set forth hereinafter, the planetary crank gear drive assembly in accordance with the present invention includes a pair of spaced planetary gears at opposite ends of a wheel lever. These gears rotate about a sun gear and one of the planetary gears drives a swing disk which is carried on the shaft of the conveyor drum. The second planetary gear drives a crank lever which rotates the shaft of the conveyor drum.

The conveyor drum is rotated at a non-uniform speed and the planetary crank gear assembly compensates for any rotational forces which might be created by insuring that the rotational masses are balanced. Thus no adverse forces are imparted to the machine drive as a whole.

By utilizing the planetary crank gear drive assembly for the conveyor drum in accordance with the present invention, it is possible to use a conveyor drum which rotates at a non-uniform speed in the folder of a web-fed rotary printing machine. The folder may be capable of producing more than 35000 folded signatures per hour. The adverse effects conventionally imparted to the drive of the web-fed rotary printing machine and thus to all of the folders and printing units of the machine can be substantially eliminated by the planetary crank gear drive assembly of the present invention. Accordingly, the quality of printing will not be adversely affected and there will be no decrease in production.

BRIEF DESCRIPTION OF THE DRAWINGS

While the novel features of the planetary crank gear drive assembly in accordance with the present invention are set forth with particularity in the appended claims, a full and complete understanding of the invention may be had by referring to the description of a preferred embodiment as set forth hereinafter and as may be seen in the accompanying drawings in which:

DESCRIPTION OF A PREFERRED EMBODIMENT

Figure 1:
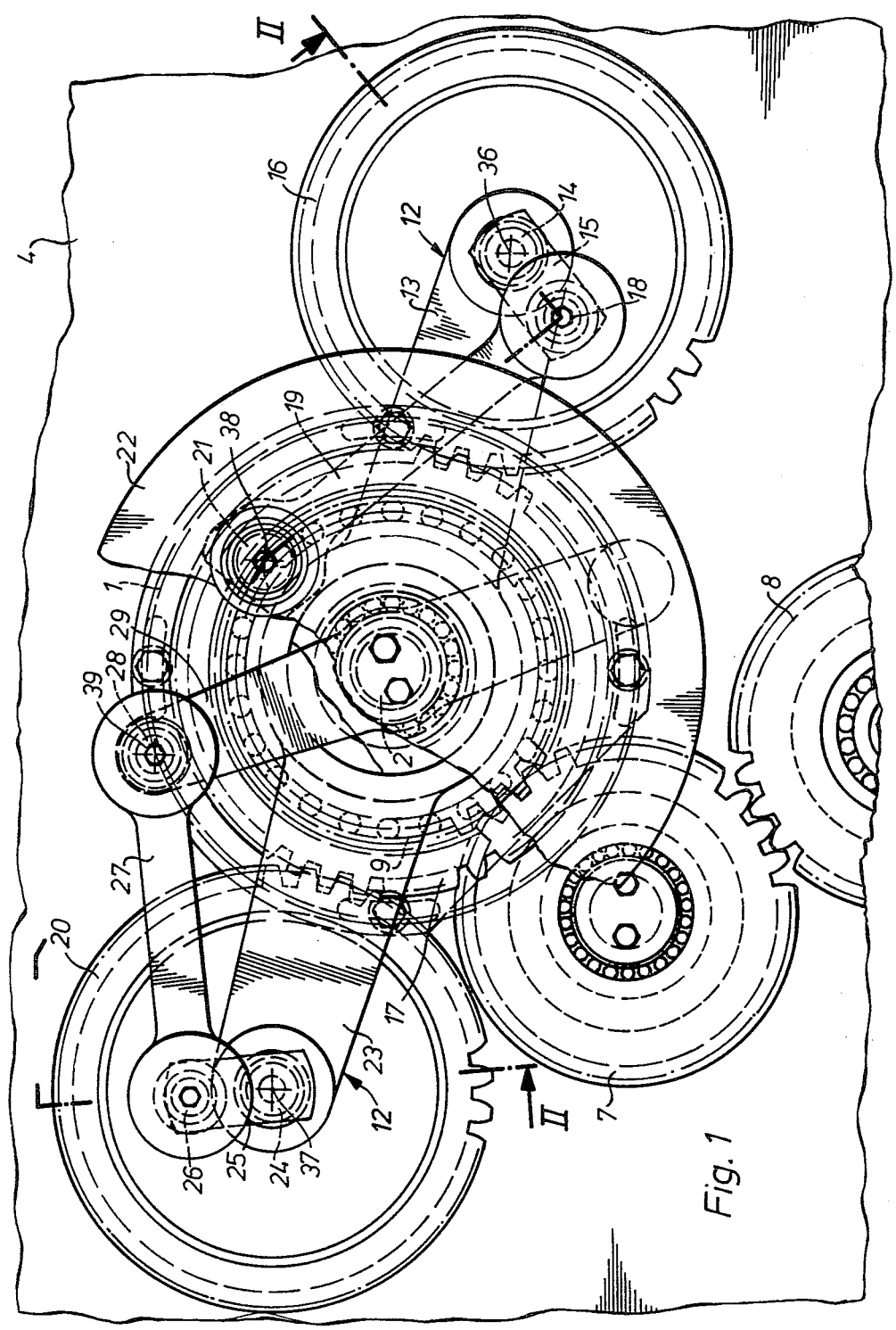
FIG. 1 is a side elevational view of the planetary crank gear drive assembly for a conveyor drum in a folder of a web fed rotary printing machine in accordance with the present invention with portions removed for clarity.
Figure 2:
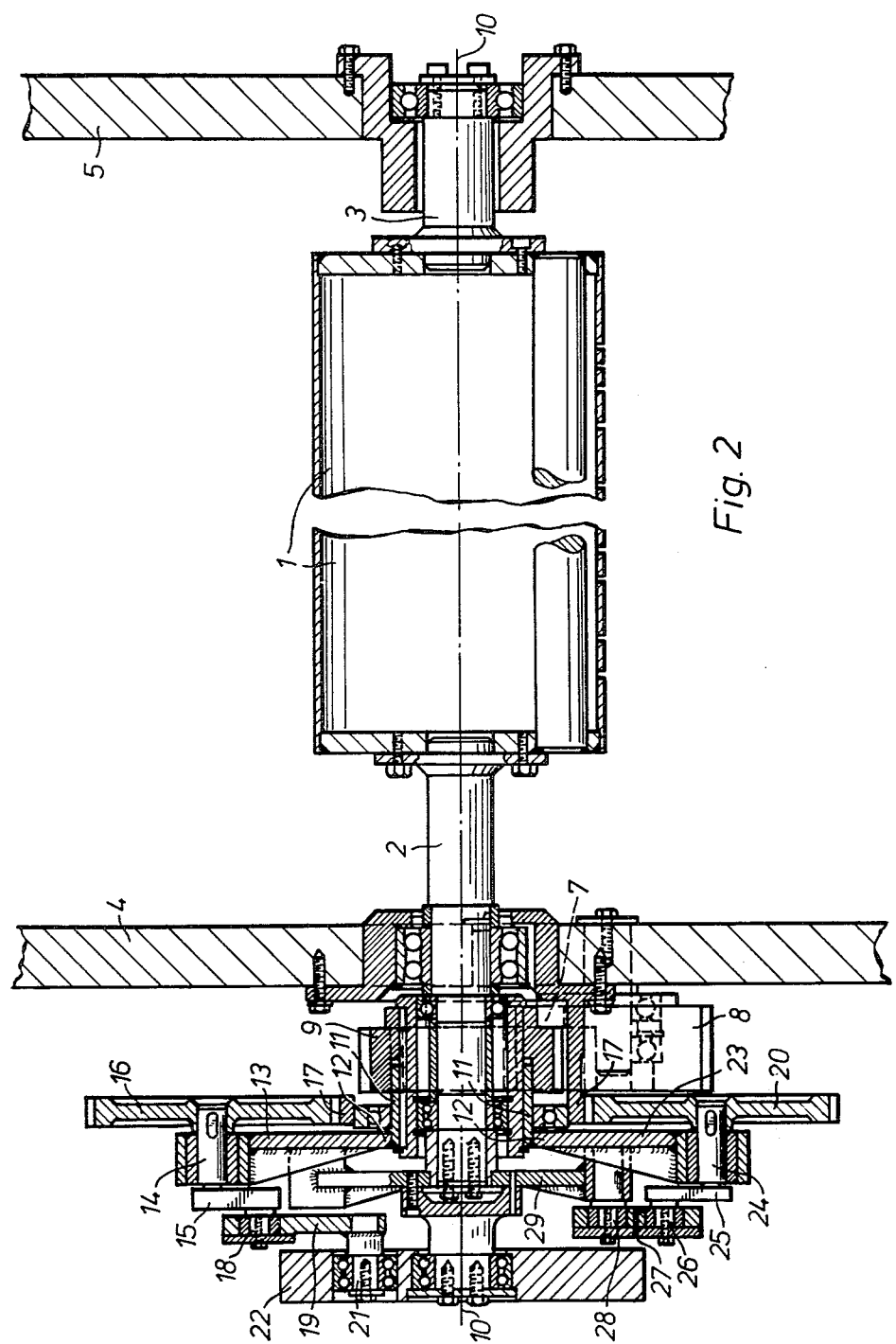
FIG. 2 is a partial cross-sectional view of the planetary crank gear drive assembly of the present invention, taken along line II-II of FIG. 1.

Turning now to FIGS. 1 and 2, there may be seen a conveyor drum 1 for a folder in a web-fed rotary printing press. Conveyor drum 1 is suitably secured to shafts 2 and 3 which are supported by conventional bearing assemblies in the side frames 4 and 5 of the machine. Conveyor drum 1 is thus supported so as to rotate about its axis of rotation 10. As is discussed in German Pat. No. 547993, two separate sheets which are cut from different paper webs or ribbons and which may be of differing sizes or may be fed at differing speeds, are to be conveyed to a collecting cylinder which is rotating at a uniform speed. The cut sheet which is the shorter of the two or which is being fed at a slower speed must be accelerated by means of the conveyor drum 1. This acceleration must be sufficient to cause the sheet to arrive at the collecting cylinder at a speed equal to the peripheral speed of the collecting cylinder. To cause this acceleration of the slower or shorter sheet, the conveyor drum 1 must rotate at a non-uniform speed so that the rotation of the conveyor drum 1 is subjected to positive or negative acceleration. The planetary crank gear drive assembly of the present invention allows such changes in rotational speed without adversely affecting the machine drive as a whole.

As may be seen most clearly in FIG. 2, a hollow gear 9 is supported on a hub 11 and is secured thereto. Hub 11 is carried by suitable bearings on shaft 2 and gear 9 is driven by the main drive (not shown) of the printing machine. The gearings are provided in such a manner that the conveyor drum 1 has, in rigid and direct input onto its drum journal or shaft 2, a lower peripheral speed than that of the collecting cylinder which is coordinated to the conveyor drum 1, for example 70% of the cylinder speed. Hollow gear 9 is integrally secured to hub 11 which rotates concentrically around the drum journal 2.

Figure 3:
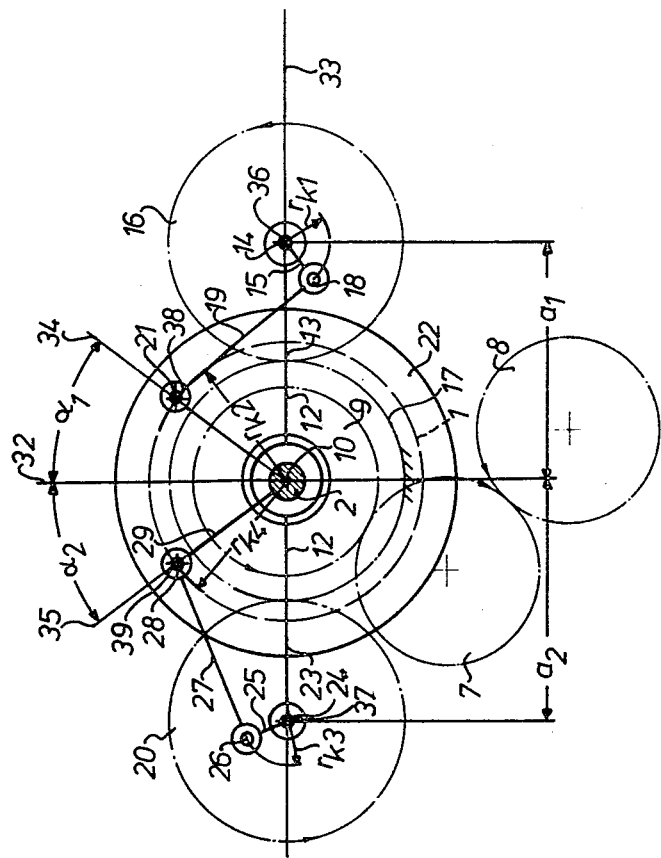
FIG. 3 is a diagramatical view of the planetary crank gear drive assembly of FIG. 1.
Figure 4:
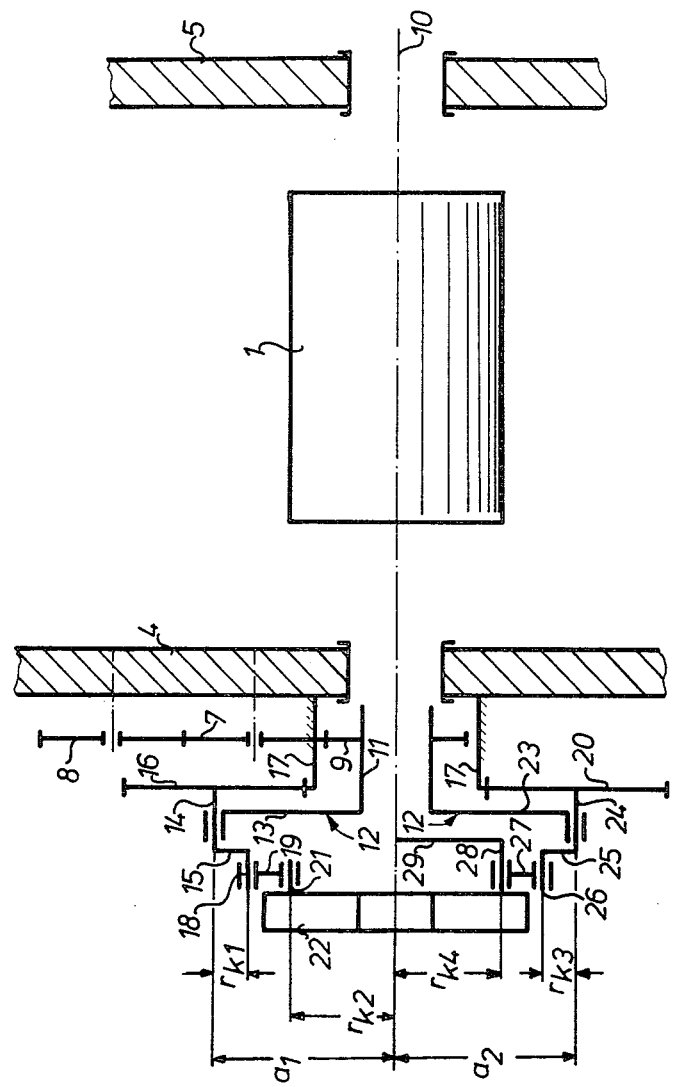
FIG. 4 is a schematic view of the planetary crank gear drive assembly in accordance with the present invention.

Hub 11 carries a wheel lever 12 having two arms on its free extremity. A crank shaft 14, having a flying disposed crank 15 at a first end, is rotatably supported in a first arm 13 of the wheel lever 12 at a distance $a_1$ from the axis of rotation 10 of drum 1, as shown in FIG. 4. A planetary gear 16 is secured on a second end of the crank shaft 14 by suitable means; the teeth of planetary gear 16 engaging the teeth of a sun gear 17. Sun gear 17 is secured to the machine frame 4 and is concentrically disposed about the drum journal 2. Crank 15 ends in a rotary crank journal 18, the center of which rotates on a crank circle having a radius $r_{k1}$, as seen in FIGS. 3 and 4, whose origin is in the center of rotation 36 of the crank shaft 14.

A connecting piece 19 is supported at a first end by means of a joint on the rotary crank journal 18. A second end of connecting piece 19 is supported by means of a joint on a rotary crank journal 21. The rotary crank journal 21 is integrally secured to a swing disk 22, this swing disk 22 being rotatably supported on the drum journal 2 by suitable bearings. The rotary crank journal 21 rotates on a crank circle having a radius $r_{k2}$, as may be seen in FIGS. 3 and 4, the center of which lies on the axis of rotation 10 of the conveyor drum 1.

A second arm 23 of the wheel lever 12 is disposed opposite the first arm 13, such that arms 13 and 23 are spaced 180° from each other. A crank shaft 24, with a flying disposed crank 25, is rotatably supported in the arm 23 at a distance $a_2$ from the axis of rotation 10 of the drum journal 2. The distances $a_1$ and $a_2$ are preferably equal. The crank 25 has a free end that terminates in a rotary crank journal 26 which forms a hinged joint with a first extremity of a connecting piece 27, a second extremity of the connecting piece 27 forming a second hinged joint with a rotary crank journal 28. The rotary crank journal 28 is integrally secured to a crank lever 29, which is integrally secured to the drum journal 2. The rotary crank journal 26 rotates on a circle, the crank circle radius $r_{k3}$ of which has its origin in the axis of rotation 37 of the crank shaft 24. The rotary crank journal 28 rotates on a circle with a radius $r_{k4}$, the origin of the radius being on the axis of rotation 10 of the drum journal 2 and the conveyor drum 1. These several circles of rotation are shown in FIGS. 3 and 4.

It is necessary that the swing moment $M_\ddot{u}$ of the conveyor drum 1 plus the drum journal 2 plus the drum journal 3 be exactly as great, with opposite force, however, as the swing moment $M_s$ of the swing disk 22. Since the swing moment $M_\ddot{u}$ of the conveyor drum 1 with the drum journals 2 and 3, and the swing moment $M_s$ of the swing disk 22 are in every phase of motion always equal with opposed forces, the resulting mass forces of the masses rotating around the axis of rotation 10 become equal to zero or nearly equal to zero. Therefore there are no instantaneous shocks effecting the drive of the conveyor drum 1 and thus the main drive of the machine.

The power input for the swing disk 22 and the conveyor drum 1 is transmitted from the main drive of the machine (not shown) through spur gears 8 and 7 onto the hollow gear 9. From the hollow gear 9 the infed power is transferred through the hub 11 onto the wheel lever 12. Since the wheel lever 12 rotates around the axis of rotation 10 of the conveyor drum 1, the planetary gear 16 and the planetary gear 20 rotate around the sun gear 17. As a result of the rotation of the planetary gear 16 the crank shaft 14 and the crank 15 are also caused to rotate. This rotary motion is transferred to the rotary crank journal 21 by means of the connecting piece 19 and thus to the swing disk 22. That means that the swing disk 22 performs, relatively to its position on the crank circle with the radius $r_{k2}$, a rotary motion around its axis of rotation in either a clockwise or a counter-clockwise direction.

The planetary gear 20 is moved around the sun gear 17, which is secured to the frame 4, by means of the arm 23 of the wheel lever 12 rotating around the axis of rotation 10. By this motion, the planetary gear 20 is caused to rotate, and therefore the crank shaft 24 and the crank 25 integrally secured to the crank shaft 24 also are rotated. A rotary motion is transferred to the drum journal 2 and thus to the conveyor drum 1 due to the fact that the connecting piece 27 is interposed between the rotary crank journal 26 of crank 25 and the rotary crank journal 28 of the crank lever 29. This rotary motion is non-uniform. A rotary motion is superposed to it, which is positive or negative depending on the position taken by the rotary crank journal 26 on the crank circle with the radius $r_{k3}$.

Since the planetary gears 16 and 20 have an equal direction of rotation, the swing moments $M_\ddot{u}$ and $M_s$ have an opposed direction. The lever ratios are provided such as to make sure that the swing moments $M_\ddot{u}$ and $M_s$ are equal with opposed forces in every phase of motion. Preferably $a_1 = a_2$, $r_{k1} = r_{k3}$ and $r_{k4} = r_{k2}$. The lengths of the connecting pieces 19 and 27, and the swing masses of the swing disk 22 and the swing masses secured on the axis of rotation 10 are equal. Therefore the angle positions $\alpha_1$ and $\alpha_2$ taken by the rotary crank journal 21 of the swing disk 22 and the rotary crank journal 28 of the crank lever 29, respectively are always equal with reversed premises.

The angle $\alpha_1$, as seen in FIG. 3, defines, in this case, the angle which is always formed between a straight line 32 disposed vertically to a straight line 33 passing through the centers of rotation 36 and 37 of the crank shafts 14 and 24 and the straight line 34 passing through the center 38 of the rotary crank journal 21 and through the intersection of the straight line 32 with the straight line 33. The straight lines 32, 33 and 34 intersect in a point on the axis of rotation 10.

The angle $\alpha_2$, as seen in FIG. 3, is defined such that it is formed between the straight line 32 and a straight line 35 which passes always through the center 39 of the rotary crank journal 28 and of the intersection; i.e. the axis of rotation 10, of the straight line 32 with the straight line 33. The straight lines 32, 33 and 35 intersect in a point on the axis of rotation 10.

While there has hereinabove been fully and completely described a preferred embodiment of a planetary crank gear drive assembly for a conveyor drum of a folder in a web-fed rotary printing press, it will be obvious to one of skill in the art that a number of changes in, for example the types of bearings used, the type of crank levers used, the type of conveyor drum and the like may be made without departing from the true spirit and scope of the present invention and that the invention is to be limited only by the following claims:

We claim:

1. A planetary crank gear for a conveyor drum equipped with controllable pins or grippers in a folder in a rotary printing machine, comprising:

a double-armed wheel lever supported on a drum journal of said conveyor drum, said wheel lever being capable of rotating and of being driven by a drive means of said printing machine;

a first crank shaft integrally formed with a first planetary gear rotatably supported in a first arm of the wheel lever at a distance $a_1$ from the axis of rotation of said conveyor drum;

a first crank, having a radius of crank circle $r_{k1}$, integrally formed with said first crank shaft;

a first rotary crank journal of said first crank being connected by means of a first joint with a first connecting piece;

said first connecting piece being connected by means of a second joint with a second rotary crank journal, having a radius of crank circle $r_{k2}$, of a swing mass, said swing mass being rotatably supported on said drum journal;

a second crank shaft integrally formed with a second planetary gear rotatably supported in a second arm of said wheel lever at a distance $a_2$ from said axis of rotation;

a second crank, having a radius of crank circle $r_{k3}$, being integrally formed with said second crank shaft 24;

a rotary third crank journal of said second crank being connected with a second connecting piece;

said second connecting piece being connected with a crank lever, having a radius of crank circle $r_{k4}$, by means of a fourth rotary crank journal, said crank lever being secured to said drum journal to rotate said conveyor drum;

said first and second planetary gears rotating on a sun gear.

2. A planetary crank gear in accordance with claim 1, characterized in that said first and second cranks integrally formed with said first and second planetary gears have radii of crank circles $r_{k1}$ and $r_{k3}$ with the same dimensions.

3. A planetary crank gear in accordance with claims 1 or 2, characterized in that said second rotary crank journal on said swing mass and said fourth rotary crank journal on said crank lever secured to said drum journal have radii of crank circles $r_{k2}$ and $r_{k4}$ with the same dimensions.

4. A planetary crank gear in accordance with claims 1 or 2, characterized in that said first and second connecting pieces have the same efficient lengths.

5. A planetary crank gear in accordance with claim 1, characterized in that an angular position $\alpha_2$ of said fourth rotary crank journal of said crank lever and an angular position $\alpha_1$ of said second rotary crank journal of said swing mass, with relation to a vertical line, are of the same size.

* * * * *